United States Patent Office 3,397,224
Patented Aug. 13, 1968

3,397,224
PROCESS FOR THE MANUFACTURE OF ESTERS OF BENZENE DICARBOXYLIC ACID
Yasuhiro Fujita and Junichi Hijii, Ohtake-shi, Japan, assignors to Mitsui Petrochemical Industries, Ltd., Tokyo, Japan
No Drawing. Filed Nov. 13, 1964, Ser. No. 411,088
Claims priority, application Japan, Nov. 15, 1963, 38/61,166, 38/61,167
17 Claims. (Cl. 260—475)

ABSTRACT OF THE DISCLOSURE

A process for the manufacture of a β-hydroxy-alkyl ester of a benzene dicarboxylic acid by reacting a benzene dicarboxylic acid or a monoalkyl ester thereof with an alkylene oxide in an organic cyanide solvent selected from the group consisting of methyl cyanide, ethyl cyanide, propyl cyanide and benzonitrile.

---

The present invention relates to a process for the manufacture of hydroxyalkyl esters of benzene dicarboxylic acids such as bis(β-hydroxyalkyl) esters and monoalkyl mono-β-hydroxyalkyl esters of terephthalic and isophthalic acids which are useful for the manufacture of polyalkylene phthalates.

More particularly, the present invention relates to a process for the manufacture of bis(β-hydroxyalkyl) esters or monoalkyl mono-β-hydroxyalkyl esters of benzene dicarboxylic acids which comprises reacting a benzene dicarboxylic acid or monoester thereof represented by the general formula: ROOC·C$_6$H$_4$COOH wherein R stands for hydrogen atom or alkyl radical of 1 to 4 carbon atoms with alkylene oxide in an organic cyanide as a reaction medium to convert the carboxylic radical in said benzene dicarboxylic acid or monoester thereof into β-hydroxyalkyl ester.

For directly manufacturing bis(β-hydroxyalkyl ester of terephthalic or isophthalic acid from terephthalic or isophthalic acid and alkylene oxide, the following processes have hitherto been proposed:

(1) A process for carrying out the reaction in an aqueous medium.

(2) A process for carrying out the reaction in alcohol or in a mixed medium of alcohol and ketone.

(3) A process for suspending terephthalic or isophthalic acid in a medium such as ketone, ether and alkylbenzene having a boiling point of 50° to 150° C. and then carrying out the reaction in the presence of tertiary amine catalyst.

For the manufacture of monoalkyl-β-hydroxyalkyl ester of terephthalic or isophthalic acid, it has also been proposed that monoalkyl ester of terephthalic or isophthalic acid is reacted with alkylene oxide in water as a medium and in the presence of alkali metal salt of a lower aliphatic acid as a catalyst or in a mixed solvent comprising water and organic liquid in the presence of organic acid or alkali metal salt of organic acid as a catalyst.

As the result of our studies on the process for directly manufacturing bis(β-hydroxyalkyl) esters of terephthalic and isophthalic acids and on the process for the manufacturing monoalkyl-β-hydroxyalkyl esters of terephthalic and isophthalic acids, we have now found that by using organic cyanide as medium these products can be easily manufactured in a purer state and in higher yield than those obtained by the prior art processes above-mentioned.

According to one feature of the present invention, therefore, we provide a process for manufacturing bis(β-hydroxyalkyl) ester of benzene dicarboxylic acid characterized by suspending terephthalic or isophthalic acid in organic cyanide and then reacting with alkylene oxide in the presence or absence of catalyst.

The characteristics and advantages of this process are that a reaction velocity is high, the side reaction is very small, a highly pure product can be obtained and the yield can be increased, compared with the above prior processes (1), (2) and (3).

As the examples of the organic cyanides which may be used in this process, there are mentioned the cyanides, such as methyl cyanide, ethyl cyanide, propyl cyanide and benzonitrile. Although it is industrially preferable to use the cyanide alone as the solvent, it is also possible to use the cyanide in admixture with another solvent which has a good compatibility for said cyanide such as water, ketone, alcohol, ether and hydrocarbons.

The amount of the cyanide medium which may be used in this process is 1 to 10 times, preferably 2 to 6 times the weight of terephthalic or isophthalic acid. Terephthalic or isophthalic acid is suspended in said medium with an agitation and then heated up to the reaction temperature. In this case, it is preferable to use terephthalic or isophthalic acid in finely divided form in order to accelerate the reaction. The bis(β-hydroxyalkyl) ester of terephthalic or isophthalic acid which is manufactured in the reaction can be separated from the unreacted terephthalic or isophthalic acid by filtering off the latter, because the former has a very high solubility in the hot reaction medium.

After the unreacted matter is filtered off, the solution may be cooled to precipitate said ester as crystals from the solution.

In case wherein a catalyst is not present in the solvents which are used in the above processes (1), (2) and (3), no formation of bis(β-hydroxyalkyl) ester of terephthalic or isophthalic acid can be formed even if terephthalic or isophthalic acid is reacted with alkylene oxide in the absence of catalyst, because the medium has a catalytic action. However, it is necessary that the organic cyanide must be present in a sufficient amount to serve as medium. If other solvent is used as the main medium and the cyanide is added in very small amount to the reaction system, the cyanide has substantially no catalytic action. When terephthalic or isophthalic acid is suspended in a large amount of cyanide medium and is then reacted with alkylene oxide, the catalytic action of organic cyanide is shown and thus the reaction may proceed.

The use of the catalyst can decrease the reaction time, but the absence of catalyst is preferable for obtaining a highly pure product. The catalysts which may be used are tertiary amines, for example pyridine, triethylamine, tripropylamine and dimethylaniline. The preferred amount of the catalyst which may be used is at most 6% by weight of terephthalic or isophthalic acid and when a larger amount of the catalyst is used side reactions occur and the yield is considerably decreased.

In this process of the present invention, terephthalic or isophthalic acid which is obtained by the oxidation of alkylbenzene or its derivatives such as xylene, diisopropylbenzene and bischloromethylbenzene or which is obtained by the disproportionation of salts of aromatic carboxylic acid, for example benzoic acid and phthalic acid can be used as starting material. These acids may contain impurities such as formylbenzoic acid and acetylbenzoic acid and colored matter. Even if the terephthalic or isophthalic acid which contains these impurities is used in this process of the present invention the purity of the bis(β-hydroxyalkyl) ester of terephthalic or isophthalic acid formed is very high compared with that of the prior processes.

The alkylene oxides which are used in this process of the present invention are those having 2 to 6 carbon atoms in their molecule, especially ethylene oxide, propylene oxide and butylene oxide. The preferred amount of the alkylene oxide is 1.7 to 2.1 moles per mole of terephthalic or isophthalic acid. The alkylene oxide is used in the form dissolved in the reaction medium or is used in a liquid state under pressure or cooling. Furthermore, it is also possible to supply the alkylene oxide in a gaseous state into the reaction system.

The reaction temperature in this process of the present invention is 80° to 170° C., preferably 90° to 160° C. The reaction time is preferably 0.5 to 8 hours. Generally, the reaction system is pressurized with inert gas such as nitrogen and others in order to carry out the reaction at a temperature above the boiling point of the reaction mixture and to maintain the reaction system in a liquid state.

This process of the present invention can be carried out batchwise or continuously.

According to another feature of the present invention, we provide a process for the manufacture of monoalkyl mono-β-hydroxyalkyl esters of benzene dicarboxylic acid characterized by reacting monoalkyl ester of terephthalic or isophthalic acid with alkylene oxide in organic cyanide as a solvent in the presence or absence of catalyst.

The raw materials which may be used in this process are mono lower alkyl esters of benzene dicarboxylic acids having 1 to 4 carbon atoms in the alkyl group such as monomethyl esters of terephthalic or of isophthalic acid and alkylene oxides. The alkylene oxides are those having 2 to 6 carbon atoms in the molecule, particularly ethylene oxide and propylene oxide. The alkylene oxide may be supplied into the reaction system in the form dissolved in solvent in the form of liquid or gas.

As examples of the organic cyanide which may be used in this process, such as methyl cyanide, ethyl cyanide, propyl cyanide and benzonitrile can be industrially used. The amount of solvent is 1 to 10 times, preferably 2 to 6 times the weight of mono alkyl ester of benzene dicarboxylic acid. The monoalkyl ester of benzene dicarboxylic acid may be suspended in the medium with agitation and the suspension may be heated to the reaction temperature.

Since monoalkyl mono-β-hydroxyalkyl ester of benzene dicarboxylic acid which is formed in the reaction has a high solubility in the hot reaction medium, it can be separated from the solvent and the unreacted monoalkyl ester of benzene dicarboxylic acid by a hot-filtration and the filtrate is cooled to precipitate monoalkyl mono-β-hydroxyalkyl ester of benzene dicarboxylic acid as a crystal and then the crystals are separated from the solution. The filtrate can be reused as a solvent for the reaction.

According to the process of the present invention, it is not necessary to use a catalyst, but the reaction may easily proceed in the presence of catalyst. Suitable catalysts are tertiary amines, for example pyridine, triethyl amine, tri-n-propylamine and dimethylaniline. The preferred amount of these catalysts is less than 6% by weight of monoalkyl ester of benzene dicarboxylic acid. When the reaction is carried out in the presence of more than 6% of catalyst, a side-reaction may occur and the yield is considerably decreased. If a highly pure product is desired, the absence of a catalyst is preferred.

The reaction temperature is 30 to 200° C., preferably 60 to 180° C. The reaction temperature is different depending upon the kind of medium which is used. In case where catalyst is present the reaction may be carried out at a low temperature. However, it is preferable that the reaction is carried out in the absence of catalyst at more or less high temperature because a side reaction is liable to occur in the presence of catalyst.

The process of the present invention may be carried out batchwise or continuously.

The present invention is illustrated in the following examples but not limited by them in which parts and percentages are by weight.

Example 1

100 parts of terephthalic acid which was obtained by the air-oxidation of paraxylene and has a purity of 99.2% and contained 0.3% of formyl benzoic acid, 53.4 parts of ethylene oxide and 300 parts of methylcyanide were charged into an autoclave equipped with an agitator. The autoclave in which air was purged with nitrogen was pressurized with further nitrogen to 15 kg./cm.$^2$ (gauge).

The reaction mixture was maintained at the temperature of 150° C. and the reaction was carried out for 7 hours. After the reaction, the reaction product mixture was filtered hot to separate the unreacted terephthalic acid, but terephthalic acid could not be recovered. Therefore, it may be considered that the conversion percentage of terephthalic acid to its esters might be 100%. The filtrate was cooled to about 7° C. and 119 parts of the precipitated bis(β-hydroxy ethyl) ester of terephthalic acid were filtered and separated.

This filtrate can be reused as the reaction medium but the solvent may be recovered by a distillation. In this case, 28 parts of bis(β-hydroxy ethyl) ester of terephthalic acid was recovered from the above solvent.

The bis(β-hydroxyl ethyl) ester of terephthalic acid which was obtained by the filtration and separation had a melting point of 109° C. and the pulse height reduction wave according to a polarogram was 3.0 mm. and the optical density when 2 g. of said ester was dissolved into 20 ml. of mixed solvent consisting of 20 parts of water and 80 parts of ethanol was 0.056 at the wavelength of 380 mμ.

Bis(β-hydroxy ethyl) ester of terephthalic acid which was purified by recrystallization was heated to polymerize in the presence of antimony trichloride, under a pressure of nitrogen of 0.4 mm. Hg and at the temperature of 270° C. for four hours to give a colorless polyethylene terephthalate. The obtained polyethylene terephthalate has an intrinsic viscosity of 0.65.

Comparative example

Example 1 was repeated except that methylisobutylketone was used in place of methylcyanide as medium, but bis(β-hydroxy ethyl) ester of terephthalic acid was not obtained.

Example 2

100 parts of terephthalic acid which has a purity of 99.2% and contained 0.3% of formyl benzoic acid, 53.4 parts of ethylene oxide, 300 parts of methylcyanide and 4 parts of tri-n-propylamine were charged into the autoclave as described in Example 1. The autoclave in which air was purged with nitrogen was pressurized with additional nitrogen to 10 kg./cm.$^2$ (gauge). The reaction mixture was maintained at the temperature of 110° C. and the reaction was carried out for 2 hours. The reaction product mixture was treated by the process as described in Example 1 to obtain 120 parts of bis(β-hydroxy ethyl) ester of terephthalic acid and no unreacted terephthalic acid. 30 parts of bis(β-hydroxy ethyl, ester of terephthalic acid were recovered from the filtrate. The yield was 98%. When a similar operation was carried out by using methylisobutylketone, the yield was 93%.

The comparison between the properties of bis(β-hydroxy ethyl) ester of terephthalic acid which was obtained by the use of methylcyanide as solvent and that of bis(β-hydroxy ethyl) ester of terephthalic acid which was obtained by the use of methylisobutylketone is shown in Table 1.

TABLE I

| Solvent | Optical Density at 380 mJ (percent) | Height of reduction wave according to a polarogram (mm.) | Saponification value |
|---|---|---|---|
| Methylcyanide | 0.051 | 3.5 | 439 |
| Methylisobutylketone | 0.276 | 7.4 | 427 |

Example 3

100 parts of terephthalic acid which had a purity of 99.2% and contained 0.3% of formylbenzoic acid, 53.4 parts of ethylene oxide, 400 parts of propylcyanide and 4 parts of pyridine were charged into the autoclave as described in Example 1. By carrying out the operation as described in Example 2, bis($\beta$-hydroxyethyl) ester of terephthalic acid was obtained in the yield of 97%. The melting point of the product was 109° C. The pulse height of reduction wave according to a polarogram was 3.3 mm. and the optical density in a mixed solvent consisting of water and ethanol was 0.051 at 380 m$\mu$.

Example 4

100 parts of terephthalic acid, 73.5 parts of propylene oxide, 300 parts of methylcyanide and 2 parts of tri-n-propylamine were charged into the autoclave as described in Example 1. By carrying out the operation as described in Example 2, bis($\beta$-hydroxypropyl) ester of terephthalic acid was obtained in the yield of 67%.

Example 5

100 parts of isophthalic acid, 53.4 parts of ethylene oxide and 300 parts of methylcyanide were charged into the autoclave as described in Example 1. The autoclave in which air was purged with nitrogen was pressurized to 15 kg./cm.$^2$ (gauge) with additional nitrogen.

The reaction mixture was maintained at the temperature of 95° C. for 2 hours.

After the reaction, 141 g. of bis($\beta$-hydroxyethyl) ester of isophthalic acid were obtained.

Example 6

50 g. of monomethyl ester of terephthalic acid, 15 g. of ethylene oxide and 150 g. of methyl cyanide were charged into an autoclave equipped with an agitator. The autoclave in which air was purged with nitrogen was pressurized to 15 kg./cm.$^2$ (gauge) with additional nitrogen. The reaction mixture was maintained at a temperature of 100° C. and the reaction was carried out for 2 hours. After the reaction, the reaction product mixture was hot-filtered to separate and recover the unreacted monomethyl ester of terephthalic acid. The filtrate was cooled to about 7° C. to precipitate monomethyl mono-$\beta$-hydroxyethyl ester of terephthalic acid as crystals. The crystals were filtered off from the solution. The filtrate was concentrated to recover residual monomethyl mono-$\beta$-hydroxyethyl ester of terephthalic acid. The yield was 85% based upon monomethyl ester of terephthalic acid consumed.

Example 7

Duplication of Example 6 except that the reaction temperature was 140° C., gave 93% yield.

Example 8

50 g. of monomethyl ester of terephthalic acid, 15 g. of ethylene oxide, 150 g. of methyl cyanide and 2 g. of triethyl amine were charged into the autoclave as described in Example 6. The reaction mixture was maintained at the temperature of 70° C. for 2 hours. Monomethyl mono-$\beta$-hydroxy ethyl ester of terephthalic acid was obtained in the yield of 92.5%.

What we claim is:

1. A process for the manufacture of a $\beta$-hydroxy-alkyl ester of a benzene dicarboxylic acid by reacting a benzene carboxylic acid represented by the general formula $$ROOC—C_6H_4—COOH$$

where R stands for a member selected from the group consisting of a hydrogen atom and an alkyl group having 1 to 4 carbon atoms with an alkylene oxide having 2 to 6 carbon atoms, characterized in that the reaction is carried out in an organic cyanide selected from the group consisting of methyl cyanide, ethyl cyanide, propyl cyanide and benzonitrile, the amount of said organic cyanide being 1 to 10 times the weight of said carboxylic acid reactant.

2. A process as claimed in claim 1 for the manufacture of monoalkyl mono-$\beta$-hydroxy alkyl ester of a benzene dicarboxylic acid wherein the reaction is carried at a temperature of 30–200° C.

3. A process as claimed in claim 1 wherein the reaction is carried out in the presence of a catalyst.

4. A process as claimed in claim 3 wherein the catalyst is a tertiary amine.

5. A process as claimed in claim 1 for the manufacture of a bis ($\beta$-hydroxyalkyl) ester of a benzene dicarboxylic acid wherein said temperature is 80 to 170° C.

6. A process as claimed in claim 5 wherein the reaction is carried out with a ratio of 1.7–2.1 alkylene oxide per mole dicarboxylic acid.

7. A process as claimed in claim 5 wherein the reaction is carried out in the presence of a catalyst.

8. A process as claimed in claim 7 wherein the catalyst is a tertiary amine.

9. A process as claimed in claim 5 wherein the reaction time is .5–8 hours.

10. A process as claimed in claim 5 wherein the organic cyanide is propyl cyanide.

11. A process as claimed in claim 5 wherein the reaction is carried out at a temperature of 90° C. to 160° C.

12. A process as claimed in claim 1 for the manufacture of a monoalkyl mono-$\beta$-hydroxyalkyl ester wherein said benzene dicarboxylic acid is selected from the group consisting of terephthalic acid and isophthalic acid.

13. A process as claimed in claim 12 wherein the reaction is carried out in the absence of a catalyst wherein said dicarboxylic acid is terephthalic acid.

14. A process as claimed in claim 12 wherein the reaction is carried out in the presence of a catalyst.

15. A process as claimed in claim 14 wherein the catalyst is a tertiary amine.

16. A process as claimed in claim 12 wherein the organic cyanide is methyl cyanide.

17. A process as claimed in claim 12 wherein the reaction is carried out at a temperature of 60 to 180° C.

References Cited

UNITED STATES PATENTS 3,037,049   5/1962   Vaitekuras _____ 260—475

LORRAINE A. WEINBERGER, *Primary Examiner.*

T. L. GALLOWAY, *Assistant Examiner.*